United States Patent [19]

Beck

[11] 4,279,094
[45] Jul. 21, 1981

[54] ANIMAL TRAP ATTACHMENT

[76] Inventor: John R. Beck, R.D. 2, Knox, Pa. 16232

[21] Appl. No.: 127,052

[22] Filed: Mar. 4, 1980

[51] Int. Cl.³ .......................................... A01M 23/26
[52] U.S. Cl. ...................................................... 43/96
[58] Field of Search ..................................... 43/88–96

[56] References Cited

U.S. PATENT DOCUMENTS

| 1,048,075 | 12/1912 | Hughes | 43/96 |
| 1,912,457 | 6/1933 | Lehn | 43/96 |
| 2,047,892 | 7/1936 | Serice | 43/90 X |
| 2,123,094 | 7/1938 | Briddell | 43/88 |
| 2,500,130 | 3/1950 | Lehn | 43/96 |

FOREIGN PATENT DOCUMENTS 559175 6/1958 Canada ......................................... 43/96

Primary Examiner—Stephen G. Kunin
Assistant Examiner—Robert P. Olszewski
Attorney, Agent, or Firm—Raymond N. Matson

[57] ABSTRACT

A spring and bail attachment for coil-spring, leg-hold animal traps which provides a firm stable base therefor to prevent tipping thereof to alarm the animal if a jaw is stepped on and which increases the traps holding power by preventing the animal from getting a solid pull or jerk when caught in the trap jaws and causing injury to its leg.

7 Claims, 5 Drawing Figures

ANIMAL TRAP ATTACHMENT

This invention relates generally to animal traps and more particularly to an attachment for leg-hold traps which increases their holding power while preventing abrasion to the leg of an animal caught in the trap.

It is well known to trappers to secure a trap in a manner so as to prevent an animal from getting a solid pull so as to jerk their leg free of the trap. This is accomplished in various ways. Among these are the securing of the traps chain to a springy sapling or to a log or pole which can be dragged. However, there may be no sapling where the trap is to be set or if a larger animal than expected is caught, it drags the pole until it is caught on something and then easily jerks free.

Accordingly, the main object of the present invention is to provide means to overcome the above and other similar problems faced by trappers.

An important object of the present invention is to provide an attachment for coil spring traps which will prevent an animal caught therein from getting a solid pull or jerk so as to free itself.

Another important object of the invention is to provide an attachment connected between a coil spring trap and its chain which will absorb the lunge of an animal when the chain is attached to something solid.

A further important object of the present invention is to provide an attachment for coil spring traps which acts as a stable base therefor so as to prevent tipping or shifting of the trap when an animal steps on a spring or the free trap jaw instead of the pan.

A still further important object of the present invention is to provide an attachment for spring actuated traps which by acting as a stable base, permits the removal of ground from beneath the spring to prevent its freezing and becoming inoperative.

Another important object of the present invention is to provide an attachment for a coil spring trap which acts between it and its chain and swings beneath the trapped foot when a pull is exerted to prevent abrasion to the animals foot.

Yet another important object of the present invention is to provide an attachment of the type described which may be readily installed in minutes and which is simple and economic to manufacture, and which is strong and of long life in use.

Other objects and advantages of the invention will become apparent during the course of the following description.

In the drawings, I have shown one embodiment of the invention. In this showing:

Figure 1:
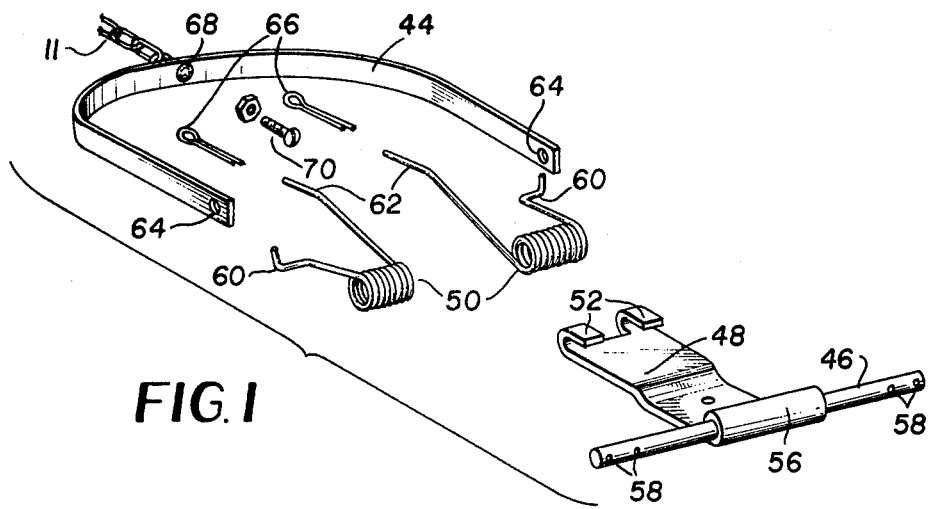
FIG. 1 is a disassembled perspective view of the bail and spring attachment for animal traps comprising the present invention.

Refering to the drawings, numeral 10 designates a conventional coil-spring animal trap and its chain 11 as a whole which comprises a laterally extending U-shaped base member 12 having upstanding apertured legs 14 in which the outwardly projecting ends 16 of the cooperating jaws 20 are mounted.

A second longitudinally extending base member 22 is fixed to the member 12 centrally thereof and has an upwardly projecting apertured end 24 which acts as a pivot for the trigger and jaw retainer 26 whose free end engages in a notch 28 when the trap is set. The notch is formed in a member 30 which supports the pan 32 and is pivoted to the member 22 as at 34.

As is well known as to coil spring traps, the jaws 20 are encompassed by actuating members 36 pivoted to the base member or cross piece 12. The members 36 are simultaneously cocked by opening the jaws 20 until one engages the base member 22 and is retained there by the trigger 26 engaging in the notch 28.

A pair of coil springs 38 are mounted on a U-shaped bar 40 fixed to the cross piece 12 and its ends 42 act respectively against the lower sides of the encompassing members 36 and the bottom of the base member 22 to resist the cocking. Upon movement of the pan 32 which releases the trigger 26, the springs force the members 36 upwardly to snap the jaws 20 tightly shut against each other.

The present invention which is attached between the trap 10 and its chain 11, comprises essentially a U-shaped, flat steel bail 44, a pivot rod 46, a clamp 48, and a pair of coil springs 50.

Figure 2:
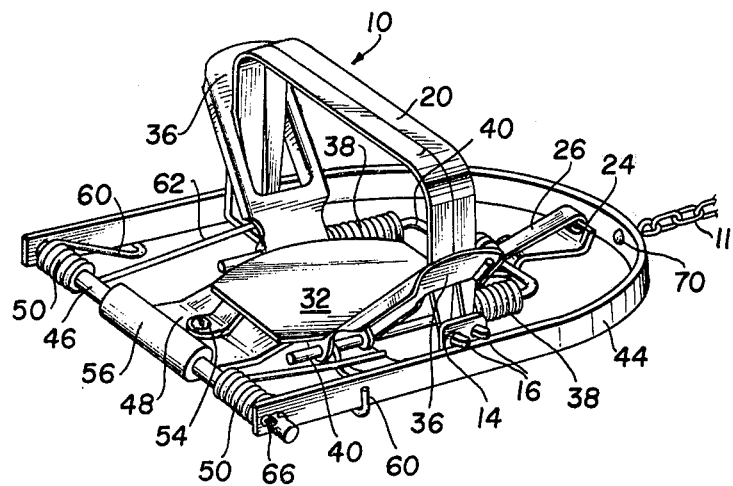
FIG. 2 is a perspective view thereof attached to a leghold, coil spring animal trap.

The clamp 48 is provided with reversely bent fingers to form hooks 52 which engage the cross piece 12 on either side of the longitudinal base member 22 and is bolted to the end of the member 22 away from the trigger 26 as at 54 (FIG. 2). The adjacent end of the clamp 48 is rolled upon itself as at 56 to receive the pivot rod 46 which is provided with a pair of spaced apertures 58 adjacent each end, which apertures are optionally used depending on the size of the trap.

The springs 50 are mounted on the rod 46 adjacent each end and their outer ends 60 bear against the undersides of the bail 44 while their inner ends 62 bear on the upper surface of the cross piece 12. The bail 44 is provided with apertures 64 adjacent its ends for mounting on the pivot rod 46 and is retained thereon by cotter pins 66 inserted through two of the apertures 58. The bail is also provided with a central aperture 68 for the reception of a swivel bolt 70 which connects it and hence the trap to the chain so as to prevent any kinking of the chain.

It will be appreciated that the entire attachment can be assembled and secured between a trap and its chain in about 3 minutes using only a screw driver and a pair of pliers or a small wrench.

Figure 3:
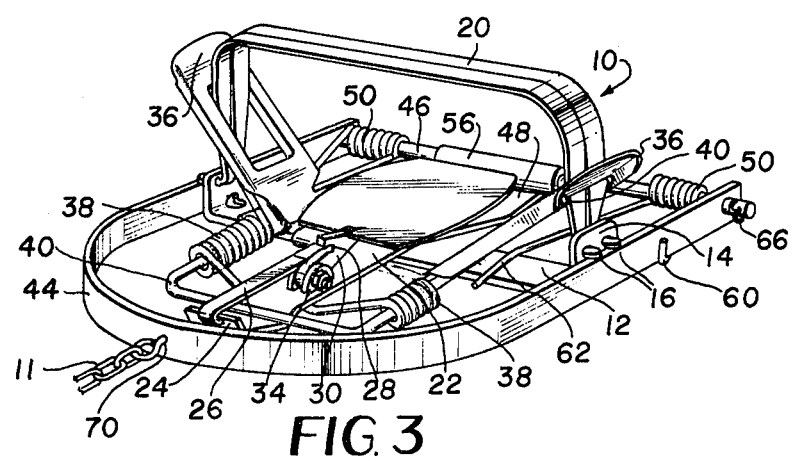
FIG. 3 is a similar view showing the other end thereof.
Figures 4, 5:
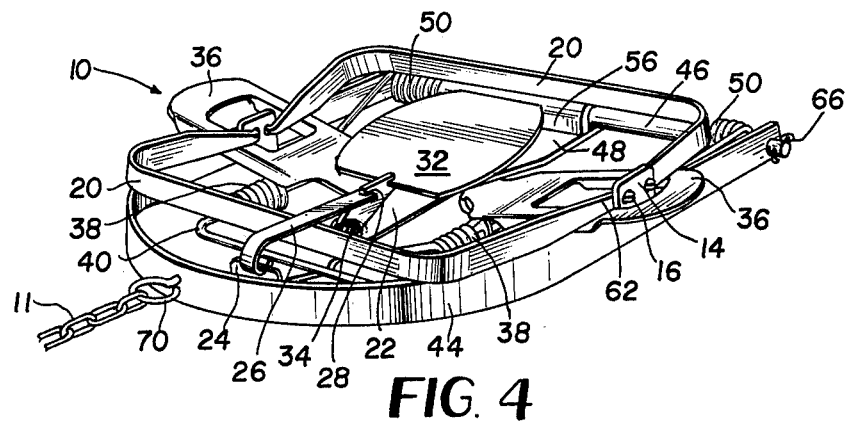
FIG. 4 is a similar view with the trap jaws set and held open by the pan and its trigger to catch an animal.
FIG. 5 is a similar view showing an animals leg caught in the jaws and pulling to swing the bail under the trap against spring pressure.

In the at rest position (FIGS. 2–4), the edges of the bail rest against the ends 16 of the jaws 20 whether the trap 10 is cocked or not. The trap is set by forcing the jaws away from each other against the action of the springs 38 to depress the encompassing members 36. When one jaw is moved down against the base member 22, the trigger 26 is moved over it and into the notch 28 of the pan 32.

In operation, the trap is placed where desired and secured or anchored by the chain 11 to a stake 5. When an animal steps on the pan 32, the jaws 20 are activated by the coil springs 38 and close to clamp the animals leg therebetween. The strong pull of the animal to free its leg (FIG. 5) causes the trap 10 to start to pivot about the pivot rod 46 of the attachment. This movement is resiliently resisted by the attachment springs 50 so that the animal's efforts to free its legs are absorbed and it cannot get a solid pull or jerk.

It is to be noted that as the pull on the jaws 20 is increased, the chain, being attached centrally of the bail, swings it beneath the trapped foot to maintain the jaws at right angles to the chain to prevent possible abrasion to the foot as often occurs when the foot is caught between the jaws ends nearest a non-centrally attached chain and slides along the jaws to their other end.

It is to be understood that the form of the invention herewith shown and described is to be taken as a preferred example of the same and that various changes in the shape, size and arrangement of parts may be resorted to without departure from the spirit of the invention or the scope of the subjoined claims.

What is claimed is:

1. An attachment to be connected between an animal trap and its anchoring chain for resiliently resisting the pull of an animal caught by the jaws of the trap comprising, in combination, a clamp to be secured to the frame of the trap; a pivot rod mounted on said clamp; a bail connected to the chain and being pivotally mounted on said rod against the frame; and spring means acting between said bail and the frame to resist pivotal movement therebetween.

2. The combination recited in claim 1 wherein said chain is connected centrally of said bail to maintain the jaws at right angles to the chain.

3. The combination recited in claim 2 wherein said connection is is a swivel connection to prevent kinking of the chain.

4. The combination recited in claim 1 wherein said bail is shaped to provide a more stable, non-tippable base for said trap.

5. The combination with a leg-hold animal trap having a frame, an anchoring chain, and spring actuated jaws mounted on the frame; a resilient means fixed to and between said frame and said chain to resist the pulling effort of an animal's leg caught in the jaws of the trap; said resilient means comprising a clamp for attachment to the frame; a pivot rod mounted in said clamp; a bail encircling the trap and connected to the chain and being pivotally mounted on said rod to permit said frame to be pivoted away from said bail in response to the pulling effort of an animal; and spring means acting between the jaws on said frame and said bail to resist movement therebetween.

6. The combination recited in claim 5 wherein said chain is connected centrally of said bail to prevent movement of an animals leg along the jaws of the trap.

7. The combination recited in claim 5 wherein said bail affords a stable, non-tippable ground supported base for said trap.

* * * * *